US012791497B2

(12) United States Patent
Hotaka

(10) Patent No.: US 12,791,497 B2
(45) Date of Patent: Nov. 10, 2026

(54) OBSERVATION APPARATUS AND OBSERVATION METHOD

(71) Applicant: HAMAMATSU PHOTONICS K.K., Hamamatsu (JP)

(72) Inventor: Hisaya Hotaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 164 days.

(21) Appl. No.: 18/785,239

(22) Filed: Jul. 26, 2024

(65) Prior Publication Data

US 2025/0044244 A1 Feb. 6, 2025

(30) Foreign Application Priority Data

Aug. 4, 2023 (JP) ................................ 2023-127744

(51) Int. Cl.
*G01B 15/02* (2006.01)
*G01N 23/041* (2018.01)

(52) U.S. Cl.
CPC ................................. *G01N 23/041* (2018.02)

(58) Field of Classification Search
CPC ...... G01N 23/041; G01B 15/02; G02B 21/14; G02B 21/0056
See application file for complete search history.

(56) References Cited

FOREIGN PATENT DOCUMENTS

JP 2004209152 A * 7/2004 ............ A61B 6/484

OTHER PUBLICATIONS

Samuel A Eastwood et al, "Automated phase retrieval of a single-material object using a single out-of-focus image", Optics Letters, Optical Society of America, US, May 15, 2011, p. 1878-p. 1880, XP001563198.
Fourmaux S et al, "Single shot phase contrast imaging using laser-produced Betatron x-ray beams", arxiv.org, Cornell University Library, 201 Olin Library Cornell University Ithaca, NY 14853, Jun. 22, 2011, p. 1-p. 3, XP080510809.

(Continued)

*Primary Examiner* — Kiho Kim

(74) *Attorney, Agent, or Firm* — Faegre Drinker Biddle & Reath LLP

(57) ABSTRACT

An observation apparatus includes a light source, an imaging unit, a thickness distribution image generation unit, and a thickness distribution image correction unit. The imaging unit receives X-rays output from the light source and passed through an observation object, and acquires a phase contrast image. The thickness distribution image generation unit generates a thickness distribution image based on the phase contrast image. The thickness distribution image correction unit corrects the thickness distribution image by setting the generated thickness distribution image as an initial image, and repeatedly performing calculation of an intensity distribution of the light after being passed through the observation object based on a spectrum and the thickness distribution image, calculation of an update amount based on the calculated intensity distribution and the phase contrast image, and update of the thickness distribution image based on the calculated update amount.

12 Claims, 11 Drawing Sheets

(56) References Cited

OTHER PUBLICATIONS

Guo Xue-Jun et al, "A phase retrieval algorithm for polychromatic x-ray in-line phase contrast imaging", 2012 International Workshop on Image Processing and Optical Engineering, SPIE, 1000 20th St. Bellingham WA 98225-6705 USA, Jan. 24, 2012, p. 833510-1-p. 833510-5, XP060000570.
Arhatari B. D. et al, "Phase imaging using a polychromatic x-ray laboratory source", Optics Express, [Online], Nov. 24, 2008, p. 19950-p. 19956, XP093231012.
Paganin, D. et al., "Simultaneous phase and amplitude extraction from a singled efocused image of a homogeneous object," Journal of Microscopy, vol. 206, 2002, pp. 33-40.
Wenz, J. et al., "Quantitative X-ray phase-contrast microtomography from a compact laser-driven betatron source," Nature Communications, 6, 7568, 2015.

* cited by examiner

OBSERVATION APPARATUS AND OBSERVATION METHOD

CROSS-REFERENCE TO RELATED APPLICATION

This application is based upon and claims the benefit of priority from Japanese Patent Application No. 2023-127744, filed on Aug. 4, 2023, the entire contents of which are incorporated herein by reference.

TECHNICAL FIELD

The present disclosure relates to an observation apparatus and an observation method.

BACKGROUND

One of techniques used for observing an observation object is phase contrast imaging. In the phase contrast imaging, a phase contrast image can be acquired by irradiating the observation object with light output from a light source, and receiving the light which is passed through the observation object by an imaging unit. Further, a thickness distribution image (phase image) of the observation object can be generated based on the above phase contrast image.

The light source used in the above configuration is a point light source (or a light source which can be considered substantially the point light source). Further, the observation object is made of a material capable of transmitting at least a part of the light output from the light source. In general, the observation object is made of a known single material. The phase contrast image which is acquired by the imaging unit is an image representing spatial change of a transmitted light intensity of the observation object, and further, is a two-dimensional image (edge enhanced image) having a high intensity at a boundary (edge) on which a thickness of the observation object is changed.

As a method for generating the thickness distribution image from the phase contrast image, a method described in Non Patent Document 1 is known. In the above method, the case in which the light output from the light source is light having a single wavelength with a narrow wavelength band (the case of monochromatic light) is assumed. In the following description, the method described above is referred to as a "monochromatic Paganin method".

The phase contrast imaging can be applied not only to the case in which the light output from the light source is the light having the single wavelength with the narrow wavelength band (the case of the monochromatic light), but also to the case in which the light output from the light source is light having a certain band (wavelength band) (the case of polychromatic light), and for example, can be applied to the case in which an X-ray tube is used as the light source.

Further, even in the case in which the phase contrast imaging is performed by using a light source which outputs not only X-rays but also light having a certain wavelength band (polychromatic light), the phase contrast image can be acquired, and further, the thickness distribution image can be generated based on the phase contrast image.

In the above case, as a method for generating the thickness distribution image from the phase contrast image, a method described in Non Patent Document 2 is known. The method described in Non Patent Document 2 is a method obtained by extending the monochromatic Paganin method described in Non Patent Document 1 to the case of the polychromatic light. In the following description, the above method extended to the case of the polychromatic light is referred to as a "polychromatic Paganin method". Further, in addition to the method described in Non Patent Document 2, several methods have been proposed as the polychromatic Paganin method.

Non Patent Document 1: D. Paganin, S. C. Mayo, T. E. Gureyev, P. R. Miller & S. W. Wilkins, "Simultaneous phase and amplitude extraction from a single defocused image of a homogeneous object", Journal of Microscopy, Vol. 206 (2002), pp. 33-40

Non Patent Document 2: J. Wenz, S. Schleede, K. Khrennikov, et al., "Quantitative X-ray phase-contrast microtomography from a compact laser-driven betatron source", Nature Communications, 6, 7568 (2015)

SUMMARY

The phase contrast imaging is considered to be more sensitive and resistant to noise than absorption imaging. However, in the case in which the phase contrast imaging is performed by using the light source which outputs the light having the wavelength band (the polychromatic light), the thickness distribution image generated based on the phase contrast image has low quantitativeness.

An object of the present invention is to provide an observation apparatus and an observation method capable of generating a thickness distribution image with excellent quantitativeness when phase contrast imaging is performed using a light source which outputs light having a wavelength band.

An embodiment of the present invention is an observation apparatus. The observation apparatus includes (1) a light source for outputting light having a wavelength band, and irradiating an observation object with the light; (2) an imaging unit for receiving light output from the light source and passed through the observation object, and acquiring a phase contrast image of the observation object; (3) a thickness distribution image generation unit for generating a thickness distribution image of the observation object based on the phase contrast image; and (4) a thickness distribution image correction unit for correcting the thickness distribution image based on a spectrum of the light output from the light source, and (5) the thickness distribution image correction unit sets the thickness distribution image generated by the thickness distribution image generation unit as an initial image, and repeatedly performs calculation of an intensity distribution of the light after being passed through the observation object based on the spectrum and the thickness distribution image, calculation of an update amount based on the calculated intensity distribution and the phase contrast image, and update of the thickness distribution image based on the calculated update amount.

An embodiment of the present invention is an observation method. The observation method includes (1) an imaging step of irradiating an observation object with light having a wavelength band output from a light source, receiving light passed through the observation object by an imaging unit, and acquiring a phase contrast image of the observation object; (2) a thickness distribution image generation step of generating a thickness distribution image of the observation object based on the phase contrast image; and (3) a thickness distribution image correction step of correcting the thickness distribution image based on a spectrum of the light output from the light source, and (4) in the thickness distribution image correction step, the thickness distribution image generated in the thickness distribution image generation step is set as an initial image, and calculation of an intensity distribution of the light after being passed through the observation object based on the spectrum and the thickness distribution image, calculation of an update amount based on the calculated intensity distribution and the phase contrast image, and update of the thickness distribution image based on the calculated update amount are repeatedly performed.

According to the embodiments of the present invention, it is possible to generate a thickness distribution image with excellent quantitativeness in the case in which phase contrast imaging is performed using a light source which outputs light having a wavelength band.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10A to FIG. 10C are diagrams showing the intensity distribution in the thickness distribution image of the observation object generated based on the phase contrast image by the simulation and the like.

DETAILED DESCRIPTION

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples.

Figure 1:
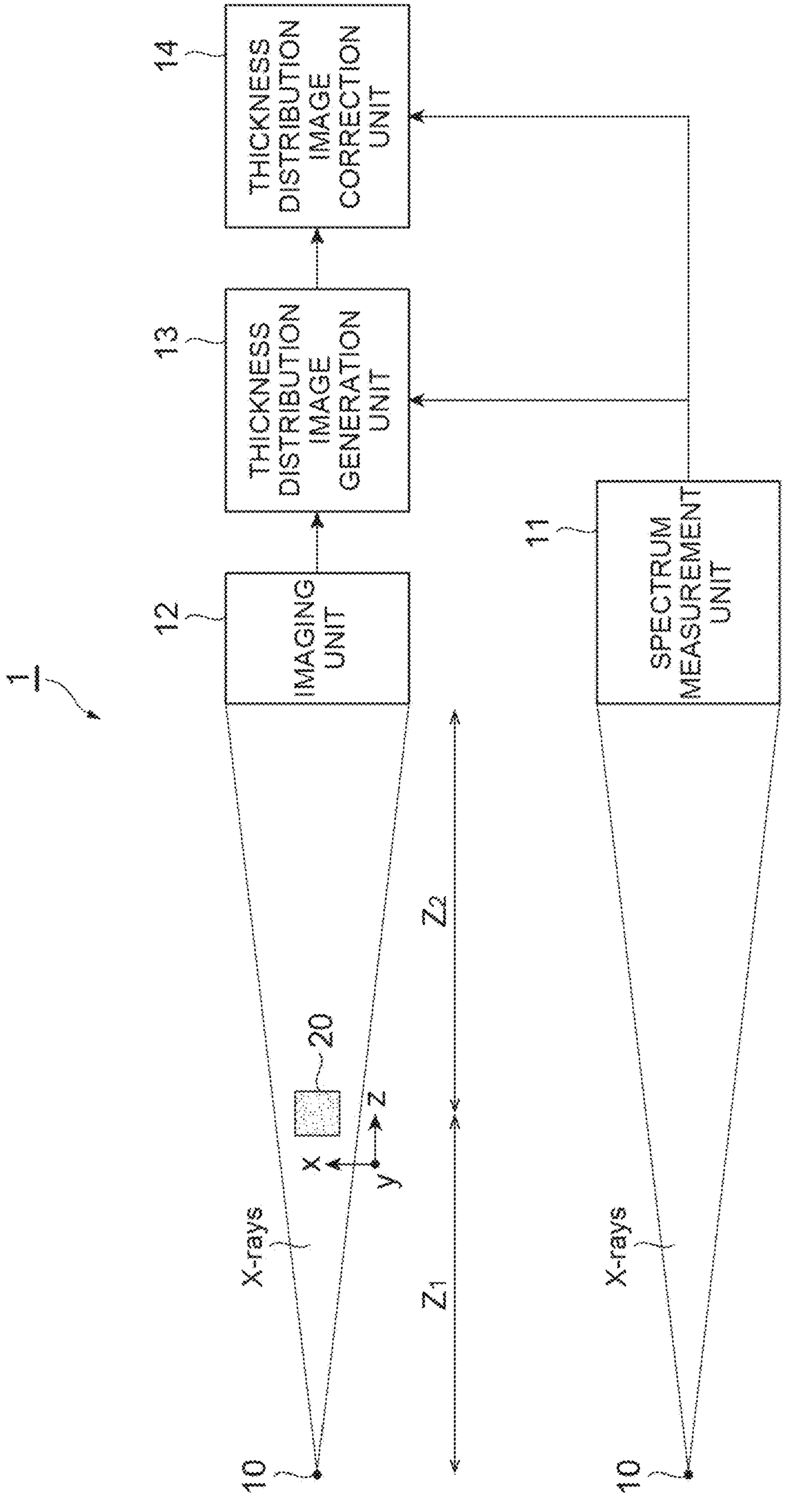
FIG. 1 is a diagram illustrating a configuration of an observation apparatus 1.

FIG. 1 is a diagram illustrating a configuration of an observation apparatus 1. The observation apparatus 1 includes a light source 10, a spectrum measurement unit 11, an imaging unit 12, a thickness distribution image generation unit 13, and a thickness distribution image correction unit 14.

Figure 2:
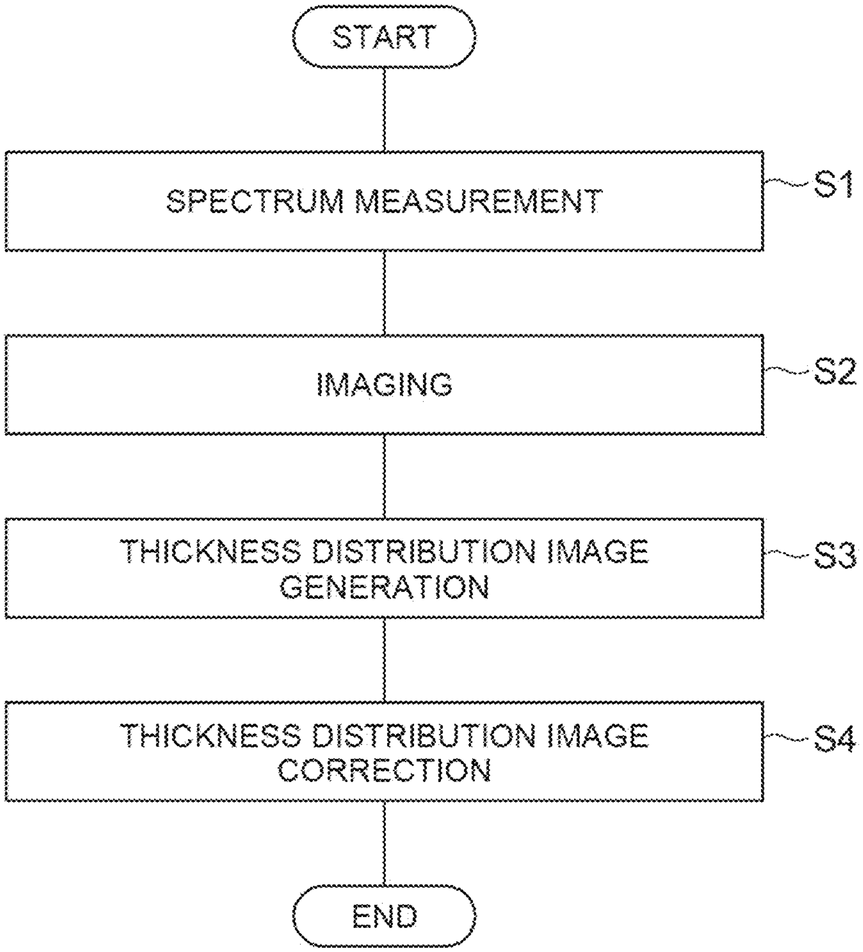
FIG. 2 is a flowchart of an observation method.

FIG. 2 is a flowchart illustrating an observation method. The observation method includes a spectrum measurement step S1 performed by the spectrum measurement unit 11, an imaging step S2 performed by the imaging unit 12, a thickness distribution image generation step S3 performed by the thickness distribution image generation unit 13, and a thickness distribution image correction step S4 performed by the thickness distribution image correction unit 14.

The observation apparatus 1 and the observation method described above can acquire a phase contrast image of an observation object 20 which is disposed between the light source 10 and the imaging unit 12, and further, can generate a thickness distribution image (phase image) of the observation object 20 based on the above phase contrast image. The observation object 20 is, for example, an object made of a known single material capable of transmitting at least a part of the light output from the light source 10.

The light source 10 is a point light source (or a light source which can be considered substantially the point light source). The light source 10 may be a microfocus X-ray source. In the following description, the configuration in the case in which the light source 10 is set to the microfocus X-ray source is described. In this case, the light output from the light source 10 and with which the observation object 20 is irradiated is X-rays. In the case in which the phase contrast imaging is performed, the light source 10 outputs the X-rays as diverging light, and the observation object 20 is irradiated with the X-rays. Further, in the case in which the spectrum measurement is performed, the light source 10 causes the X-rays to be incident on the spectrum measurement unit 11 without passing through the observation object 20.

The spectrum measurement unit 11 measures an energy spectrum (wavelength spectrum) of the X-rays output from the light source 10 (the spectrum measurement step S1). The X-ray spectrum measured by the spectrum measurement unit 11 is used at the time of the correction of the thickness distribution image performed by the thickness distribution image correction unit 14. Further, the X-ray spectrum may be used at the time of the generation of the thickness distribution image performed by the thickness distribution image generation unit 13.

In addition, the spectrum measurement step S1 does not need to be performed as a first step, and may be performed before the processing in which information of the X-ray spectrum is required. Further, in the case in which the spectrum of the X-rays output from the light source 10 is known by the previous measurement, or in the case in which the X-ray spectrum corresponding to a tube voltage and a tube current set in the light source 10 is known, the spectrum measurement unit 11 may not be provided, and further, the spectrum measurement step S1 may not be performed every time the imaging unit 12 performs the acquisition of the phase contrast image.

The imaging unit 12 receives the X-rays, which are output from the light source 10 and passed through the observation object 20, on an imaging plane, and acquires the phase contrast image I of the observation object 20 (the imaging step S2). Further, the imaging unit 12 receives the X-rays output from the light source 10 on the imaging plane in the state in which the observation object 20 is not disposed, and acquires a background image lin.

In addition, the phase contrast imaging by using the X-rays in the configuration as illustrated in FIG. 1, for example, may be referred to as propagation based phase contrast X-ray imaging, or in-line phase contrast X-ray imaging.

As the spectrum measurement unit 11, for example, a semiconductor detector such as Si, CdTe, and the like, a photon counting X-ray imaging sensor, and the like can be used. In addition, the photon counting X-ray imaging sensor can also be used as the imaging unit 12, and further, the spectrum can be measured by performing the photon counting with the light reduced at the time of the spectrum measurement by using the imaging unit 12.

In the above cases, the spectrum measurement unit 11 and the imaging unit 12 may be configured in common, and further, spectrum correction is not required, and therefore it is preferable. In the case in which the spectrum measurement unit 11 and the imaging unit 12 use devices made of the same element, sensitivity correction is not required, and therefore it is preferable.

The thickness distribution image generation unit 13 generates the thickness distribution image of the observation object 20 based on the phase contrast image acquired by the imaging unit 12 (the thickness distribution image generation step S3). The thickness distribution image correction unit 14 corrects the thickness distribution image generated by the thickness distribution image generation unit 13 (the thickness distribution image correction step S4). The details of the above processes will be described later.

The thickness distribution image generation unit 13 and the thickness distribution image correction unit 14 may be configured by a computer including a processing unit (for example, a CPU, or the like) for performing operation processing, a storage unit (for example, a hard disk drive, a ROM, a RAM, or the like) for storing programs and various data necessary for performing the operation processing, a display unit (for example, a liquid crystal display, or the like) for displaying operation conditions and operation results, and an input unit (for example, a keyboard, a mouse, or the like) for receiving various inputs.

Figure 3A:
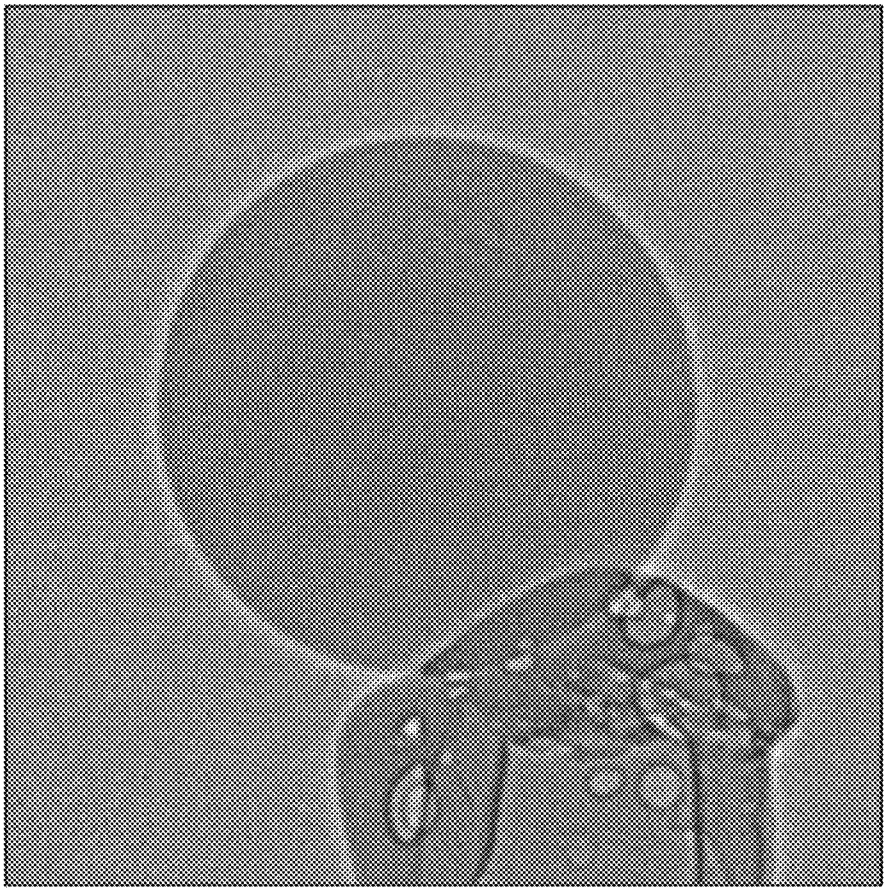
FIG. 3A and FIG. 3B are diagrams showing an example of a phase contrast image of an observation object acquired by an imaging unit 12.
Figure 3B:
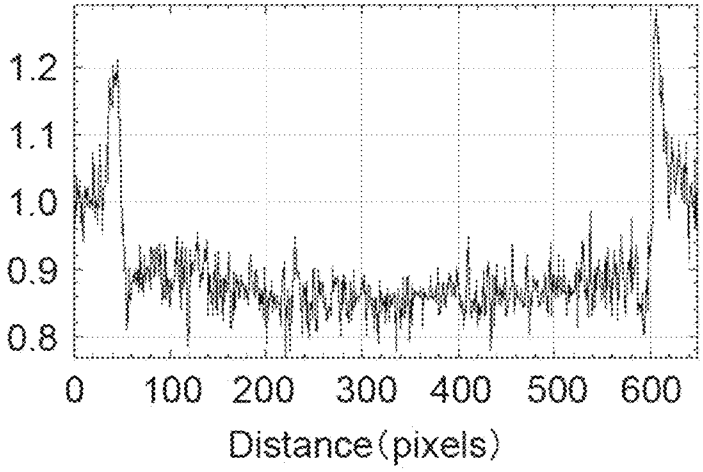

FIG. 3A and FIG. 3B are diagrams showing an example of the phase contrast image of the observation object acquired by the imaging unit 12. FIG. 3A shows the phase contrast image, and FIG. 3B shows an intensity distribution on a straight line passing through a bead center position in the phase contrast image.

Figure 4A:
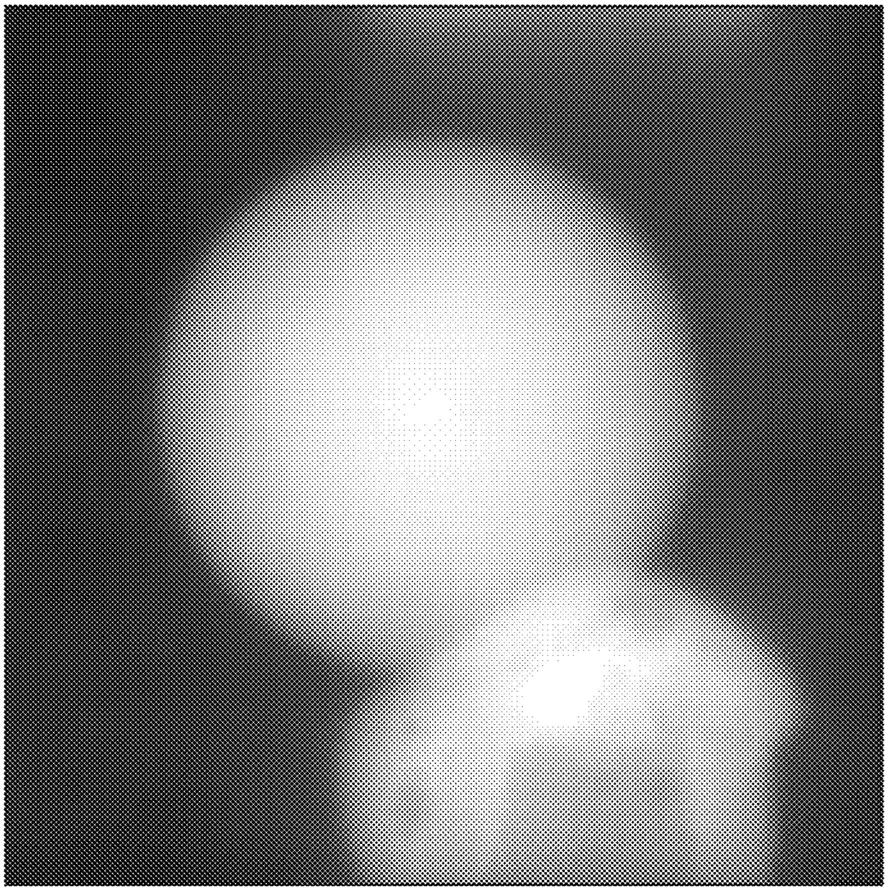
FIG. 4A and FIG. 4B are diagrams showing an example of a thickness distribution image of the observation object generated by a thickness distribution image generation unit 13 based on the phase contrast image shown in FIG. 3A and FIG. 3B.
Figure 4B:
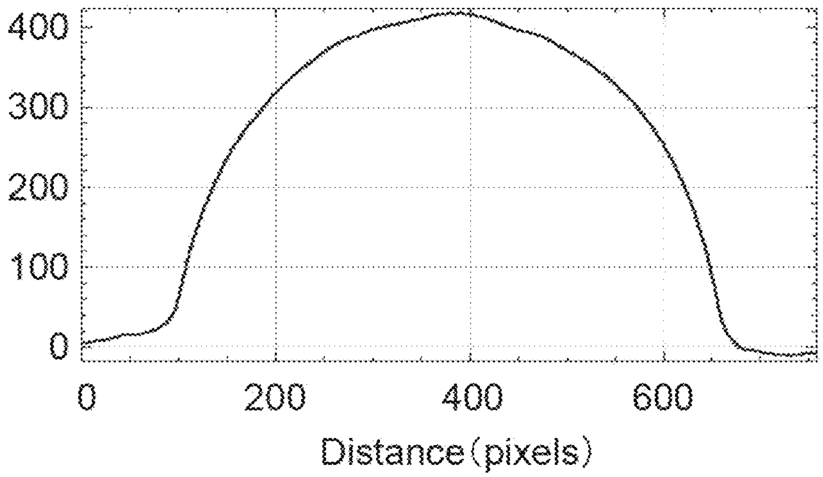

FIG. 4A and FIG. 4B are diagrams showing an example of the thickness distribution image of the observation object generated by the thickness distribution image generation unit 13 based on the phase contrast image shown in FIG. 3A and FIG. 3B. FIG. 4A shows the thickness distribution image, and FIG. 4B shows the intensity distribution on the straight line passing through the bead center position in the thickness distribution image. The observation object used in this case is a polystyrene bead of a spherical shape having a diameter of 300 μm (the same applies to the following diagrams).

The monochromatic Paganin method (the following Formula (1)) described in Non Patent Document 1 is used when the thickness distribution image (FIG. 4A and FIG. 4B) is generated based on the phase contrast image (FIG. 3A and FIG. 3B).

[Formula 1]

$$T(r) = -\frac{1}{\mu}\log_e\left\{F^{-1}\left[\mu\frac{F\left[M^2 I(Mr)\right]/I_{in}(Mr)}{z_2\delta k^2/M+\mu}\right]\right\} \tag{1}$$

The respective parameters included in the above Formula (1) are as follows. An xyz orthogonal coordinate system is set as illustrated in FIG. 1. The x axis and the y axis are parallel to the imaging plane of the imaging unit 12. The z axis is parallel to a direction from the light source 10 toward the imaging unit 12.

r is a variable representing a two-dimensional position on the xy plane at the z direction position on which the observation object is disposed. M is a magnification at the time of the acquisition of the phase contrast image. In the case in which a distance between the light source 10 and the observation object 20 is set to $z_1$ and a distance between the observation object 20 and the imaging plane of the imaging unit 12 is set to $z_2$, the magnification M is represented by the following Formula (2).

[Formula 2]

$$M = \frac{z_1 + z_2}{z_1} \tag{2}$$

I(Mr) is the phase contrast image which is acquired by the imaging unit 12. $I_{in}$(Mr) is the background image which is acquired by the imaging unit 12 in the state in which the observation object 20 is not disposed, and is used for the normalization of the phase contrast image I(Mr). T(r) is the thickness distribution image.

k is a magnitude of a component parallel to the imaging plane in a wavenumber vector of the light on the imaging plane of the imaging unit 12. μ is a linear attenuation coefficient of the observation object 20. 1-δ is a refractive index of the observation object 20, and in general, δ is on the order of $10^{-6}$. F represents the Fourier transform, and $F^{-1}$ represents the inverse Fourier transform.

Even in the case in which the noise is contained in the phase contrast image as shown in FIG. 3A and FIG. 3B, the influence of the noise is reduced in the thickness distribution image as shown in FIG. 4A and FIG. 4B. As described above, the phase contrast imaging is resistant to the noise, and further, highly sensitive.

In the case in which the light output from the light source is light having the single wavelength with the narrow wavelength band, the quantitativeness of the thickness distribution image generated by using the above Formula (1) is excellent. On the other hand, in the case in which the light output from the light source is light having a certain band (wavelength band), the quantitativeness of the thickness distribution image generated by using the above Formula (1) is low.

Figure 5:
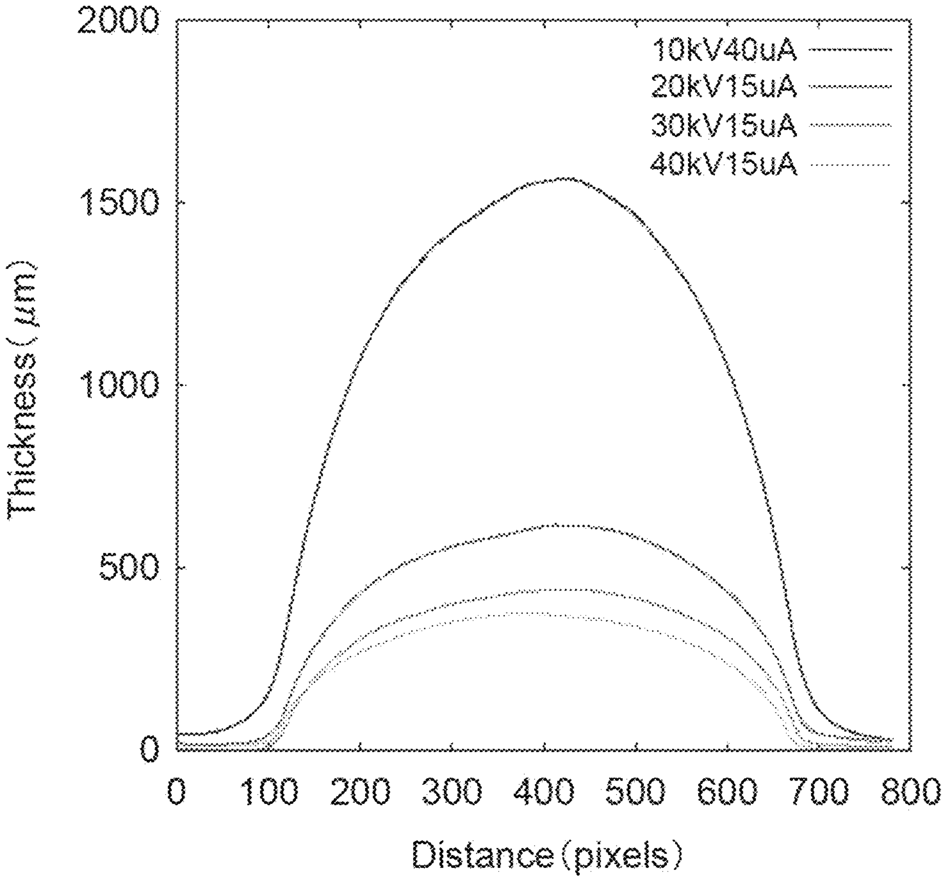
FIG. 5 is a diagram showing an example of an intensity distribution on a straight line passing through a bead center position in the thickness distribution image obtained when a tube voltage and a tube current of an X-ray source are set to various values.

FIG. 5 is a diagram showing an example of the intensity distribution on the straight line passing through the bead center position in the thickness distribution image obtained when the tube voltage and the tube current of the X-ray source are set to various values. As shown in this diagram, when the tube voltage of the X-ray source is different, the thickness distribution image is also greatly different. The reason for the above is considered as follows.

When the tube voltage of the X-ray source is different, the spectrum of the X-rays output from the X-ray source is different. Further, when the energy or the wavelength of the X-rays is different, the respective values of μ and δ of the observation object are different. However, in the above Formula (1), the thickness distribution image is generated using the respective values of μ and δ at a certain specific energy of the X-rays. As a result, in the case in which the phase contrast imaging is performed using the light source which outputs the light having the certain wavelength band, such as the X-ray source, the quantitativeness of the thickness distribution image generated based on the phase contrast image by using the above Formula (1) is low.

In order to solve the above problem, instead of the monochromatic Paganin method of the above Formula (1), it is considered to generate the thickness distribution image based on the phase contrast image by using the method (the polychromatic Paganin method) obtained by extending the Paganin method with the intention of being able to be applied to the case in which the irradiation light with which the observation object is irradiated has the wavelength band.

As the polychromatic Paganin method, the method described in Non Patent Document 2 is known, and in addition, some other polychromatic Paganin methods have been proposed. The polychromatic Paganin method described in Non Patent Document 2 is obtained by, in the above Formula (1), replacing μ and δ depending on the X-ray energy with $\mu_{mean}$ and $\delta_{mean}$ obtained by performing the weighted average with the X-ray spectrum.

The following Formula (3) is a formula for generating the thickness distribution image by using the polychromatic Paganin method which is formulated by the present inventor. In the following Formula (3), $\mu_{mean}$ is obtained by the weighted average of μ with the X-ray spectrum δ(λ), and is represented by the following Formula (4). Further, $\delta_{mean}$ IS obtained by the weighted average of δ with the X-ray spectrum δ(λ), and is represented by the following Formula (5). λ is the wavelength. The following Formula (4) and Formula (5) are represented by integration calculation, and further, these are obtained by summation calculation in numerical calculation.

[Formula 3]

$$T(r) = \frac{1}{\mu_{mean}}\left\{1 - F^{-1}\left[\frac{F[I(Mr)/I_{in}(Mr)]}{1 + z_2\delta_{mean}k^2/M\mu_{mean}}\right]\right\} \quad (3)$$

[Formula 4]

$$\mu_{mean} = \frac{\int \mu(\lambda)S(\lambda)d\lambda}{\int S(\lambda)d\lambda} \quad (4)$$

[Formula 5]

$$\delta_{mean} = \frac{\int \delta(\lambda)S(\lambda)d\lambda}{\int S(\lambda)d\lambda} \quad (5)$$

Figure 6:
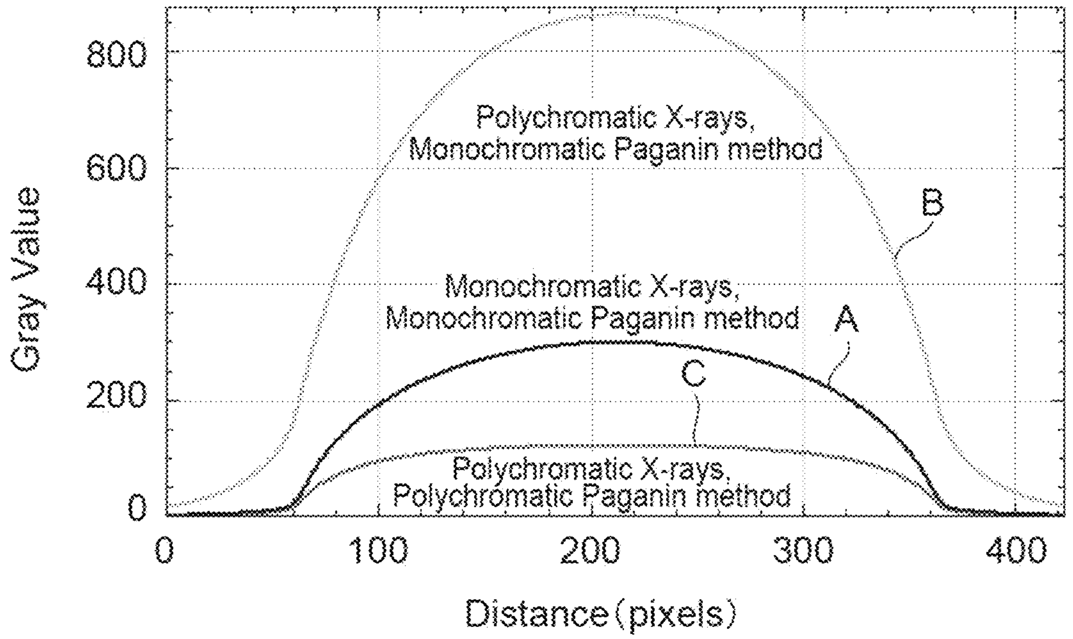
FIG. 6 is a diagram showing the intensity distribution in the thickness distribution image of the observation object generated based on the phase contrast image by a simulation.

FIG. 6 is a diagram showing the intensity distribution in the thickness distribution image of the observation object generated based on the phase contrast image by a simulation. In this diagram, the intensity distribution on the straight line passing through the center position of the observation object (bead) in each of a thickness distribution image A, a thickness distribution image B, and a thickness distribution image C is shown. The thickness distribution image A is generated by using the monochromatic Paganin method by setting the X-rays with which the observation object is irradiated to X-rays having a single wavelength. The thickness distribution image B is generated by using the monochromatic Paganin method by setting the X-rays with which the observation object is irradiated to X-rays having a wide wavelength band (the polychromatic light). The thickness distribution image C is generated by using the polychromatic Paganin method by setting the X-rays with which the observation object is irradiated to X-rays having the wide wavelength band (the polychromatic light).

Figure 7:
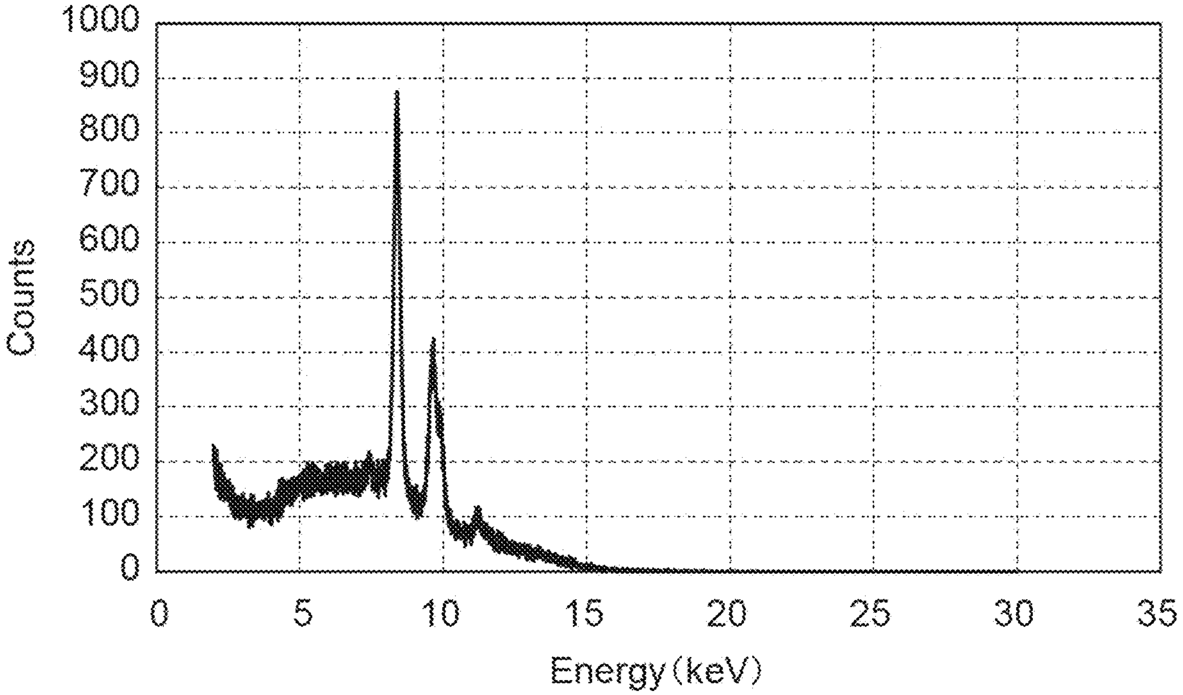
FIG. 7 is a diagram showing an X-ray spectrum in the case in which X-rays with which the observation object is irradiated have a wide wavelength band.

FIG. 7 is a diagram showing the X-ray spectrum in the case in which the X-rays with which the observation object is irradiated are set to the X-rays having the wide band (wide wavelength band) (the polychromatic light).

The thickness distribution image A is generated by setting the X-rays with which the observation object is irradiated to the X-rays having the single wavelength (energy of 8.4 keV), and using the monochromatic Paganin method (the above Formula (1)) with the respective values of μ and δ at the above X-ray energy. The quantitativeness of the thickness distribution image A is excellent.

The thickness distribution image B is generated by setting the X-rays with which the observation object is irradiated to the X-rays having the wide wavelength band, and using the monochromatic Paganin method (the above Formula (1)) with the respective values of μ and δ at the X-ray energy of 8.4 keV included in the above wavelength band. As compared with the thickness distribution image A, in the thickness distribution image B, the thickness is large as a whole, and the quantitativeness is low. Further, in the thickness distribution image B, it is indicated that there is a certain thickness also in a region immediately outside the observation object (a region in which the observation object does not exist).

The thickness distribution image C is generated by setting the X-rays with which the observation object is irradiated to the X-rays having the wide wavelength band, and using the polychromatic Paganin method (the above Formula (3)) with the respective values of $\mu_{mean}$ and $\delta_{mean}$ obtained by the weighted average of μ and δ using the X-ray spectrum (FIG. 7). As compared with the thickness distribution image A, in the thickness distribution image C, the thickness is small as a whole, and the quantitativeness is low. In addition, as compared with the thickness distribution image B, in the thickness distribution image C, the quantitativeness in a region with the small thickness is improved.

As described above, in the case in which the X-rays with which the observation object is irradiated are set to the X-rays having the wide wavelength band (the polychromatic light), the quantitativeness of the generated thickness distribution image is low regardless of whether the monochromatic Paganin method or the polychromatic Paganin method is used. Therefore, in the present embodiment, after the thickness distribution image generation step S3 of generating the thickness distribution image based on the phase contrast image by the thickness distribution image generation unit 13, the thickness distribution image correction step S4 of correcting the thickness distribution image by the thickness distribution image correction unit 14 is performed, thereby improving the quantitativeness of the thickness distribution image.

Figure 8:
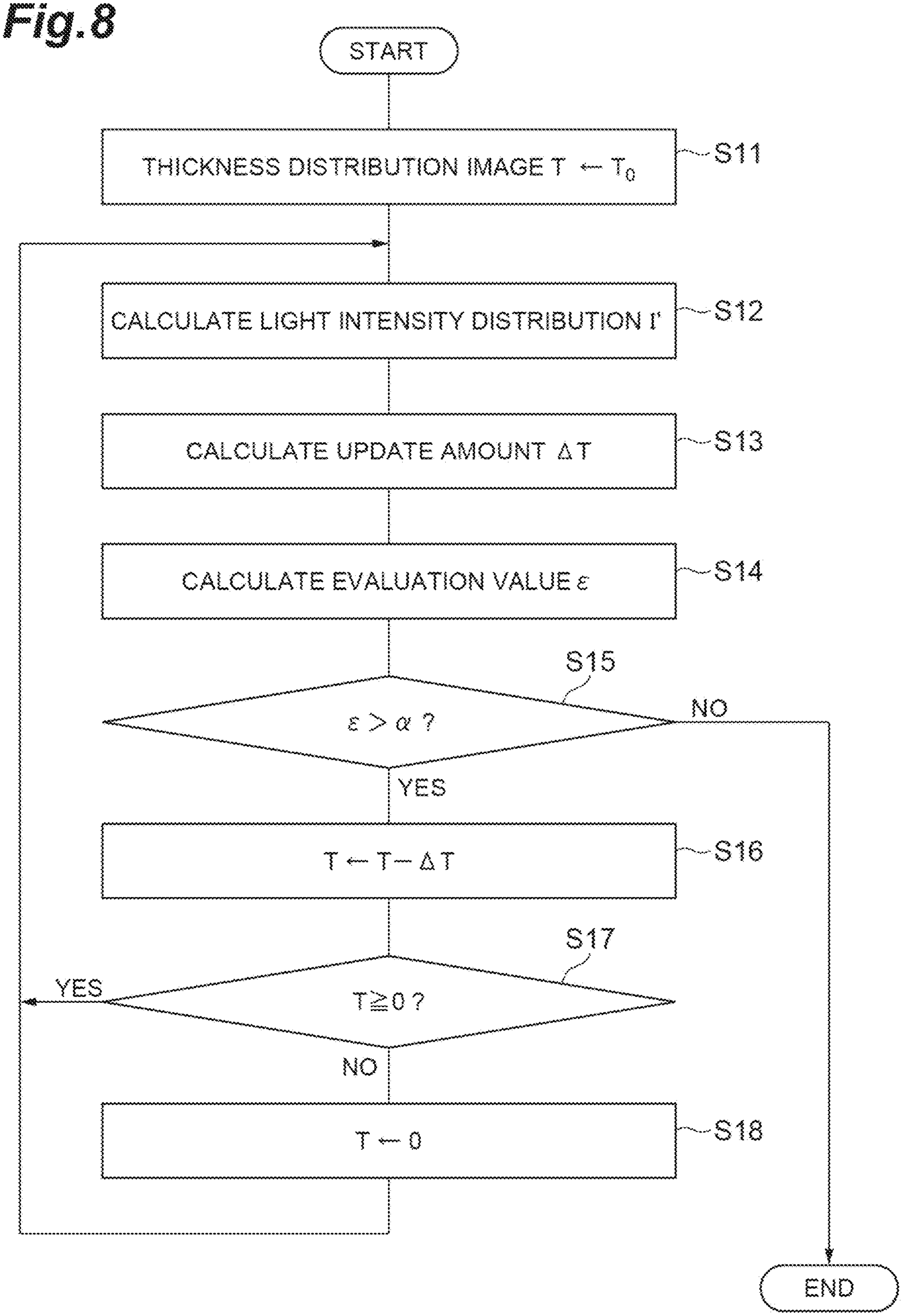
FIG. 8 is a flowchart of a thickness distribution image correction step S4.

FIG. 8 is a flowchart illustrating the thickness distribution image correction step S4. The thickness distribution image correction step S4 includes an initialization step S11, a light intensity distribution calculation step S12, an update amount calculation step S13, an evaluation value calculation step S14, a determination step S15, a thickness distribution image update step S16, a determination step S17, and a non-negative constraint step S18.

In the initialization step S11, the thickness distribution image $T_0(r)$ generated in the thickness distribution image generation step S3 is set as an initial image of the thickness distribution image T(r) in the repeated processing of the subsequent steps S12 to S18. The thickness distribution image $T_0$, which is the initial image, is preferably generated based on the phase contrast image I after the normalization by using the background image Iin. Further, the thickness distribution image $T_0$, which is the initial image, may be generated by using any one of the monochromatic Paganin method and the polychromatic Paganin method.

In the light intensity distribution calculation step S12, a light intensity distribution I' on the imaging plane of the imaging unit 12 is calculated based on the X-ray spectrum S(λ) and the thickness distribution image T(r). Specifically, when the observation object having the thickness distribution T(r) is irradiated with the X-rays having the X-ray spectrum S(λ) output from the light source 10, the intensity distribution I' of the X-rays reaching the imaging plane of the imaging unit 12 after being passed through the observation object is calculated. The details of the light intensity distribution calculation step S12 will be described later.

In the update amount calculation step S13, an update amount ΔT(r) for the thickness distribution image T(r) is calculated based on the light intensity distribution I' calculated in the light intensity distribution calculation step S12 and the phase contrast image I. The update amount ΔT(r) is represented by the following Formula (6).

[Formula 6]

$$\Delta T(r) = F^{-1}\left[\frac{F[I - I']}{\mu_{mean} + z_2\delta_{mean}k^2/M}\right] \tag{6}$$

In the evaluation value calculation step S14, an evaluation value ε used for determining whether or not to end the repeated processing of the steps S12 to S18 is calculated. The evaluation value δ is an arbitrary value as long as it can be used as an index indicating whether or not the absolute value of the update amount ΔT(r) calculated in the update amount calculation step S13 has become sufficiently small (that is, whether or not the thickness distribution image T(r) has sufficiently converged), or whether or not the absolute value of the difference between the light intensity distribution I' and the phase contrast image I has become sufficiently small.

The evaluation value ε may be represented by, for example, the following Formula (7) or Formula (8).

[Formula 7]

$$\varepsilon = \frac{\int\int|\Delta T(r)|dr}{\int\int T(r)dr} \tag{7}$$

[Formula 8]

$$\varepsilon = \frac{\int\int|I'(x, y) - I(x, y)|dxdy}{\int\int I(x, y)dxdy} \tag{8}$$

In the determination step S15, it is determined whether or not the evaluation value ε calculated in the evaluation value calculation step S14 is larger than an allowable value α. In the case in which the evaluation value ε is the allowable value α or less, the processing of the thickness distribution image correction step S4 is ended. In the case in which the evaluation value ε is larger than the allowable value α, the processing proceeds to the thickness distribution image update step S16.

In the thickness distribution image update step S16, the thickness distribution image T(r) is updated by using the update amount ΔT(r) calculated in the update amount calculation step S13 (the following Formula (9)).

[Formula 9]

$$T(r) \leftarrow T(r) \rightarrow \Delta T(r) \tag{9}$$

In the determination step S17, it is determined whether or not each of the pixel values of the thickness distribution image T(r) after being updated in the thickness distribution image update step S16 is 0 or more. In the case in which the pixel value of the thickness distribution image T(r) is a negative value, the pixel value is set to 0 in the non-negative constraint step S18, and then the processing returns to the light intensity distribution calculation step S12.

Figure 9:
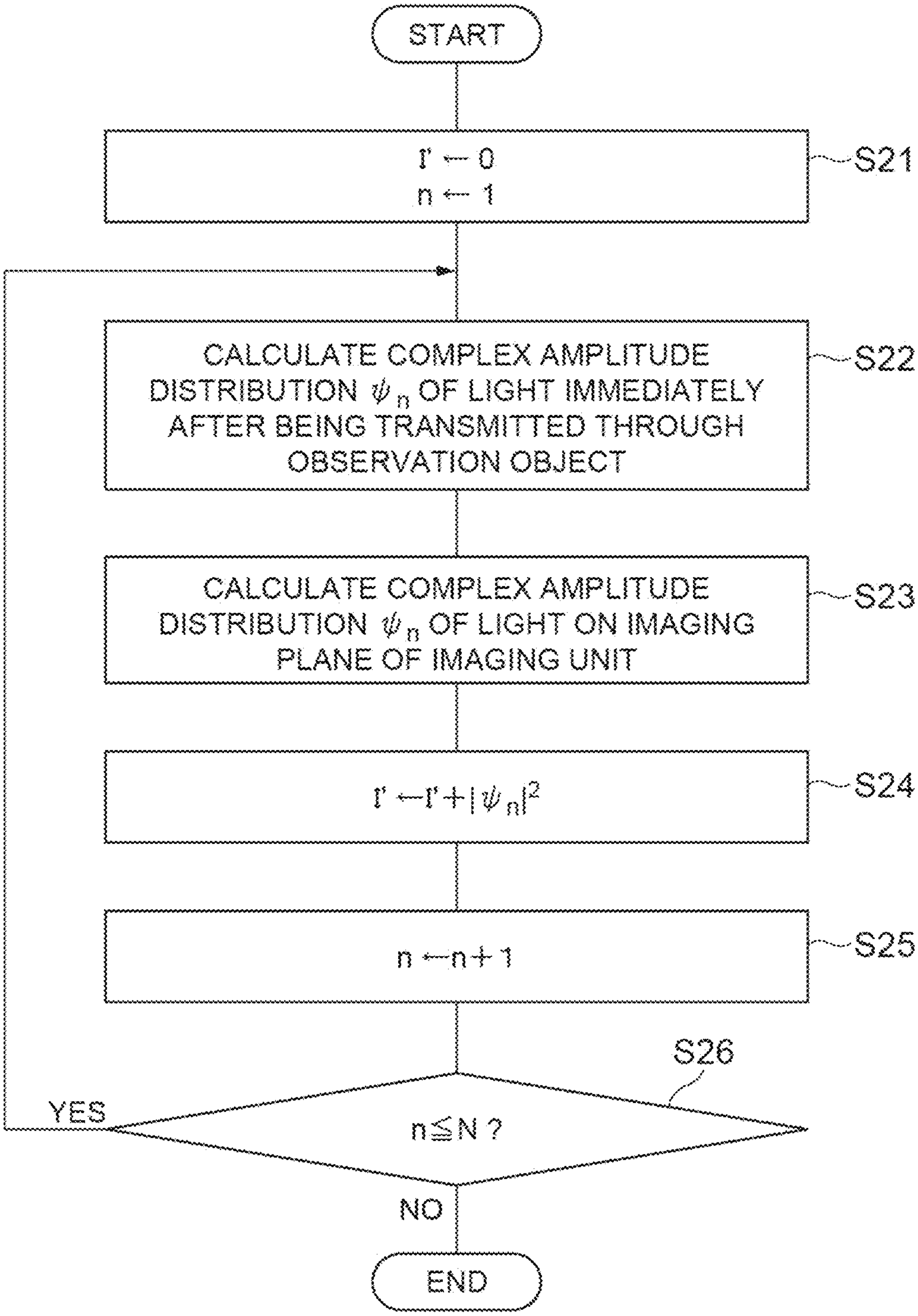
FIG. 9 is a flowchart of a light intensity distribution calculation step S12.

FIG. 9 is a flowchart illustrating the light intensity distribution calculation step S12. The light intensity distribution calculation step S12 is a step of calculating the light intensity distribution on the imaging plane of the imaging unit 12 based on the X-ray spectrum S and the thickness distribution image, and includes an initialization step S21, a transmitted light complex amplitude calculation step S22, a light propagation calculation step S23, a light intensity distribution update step S24, a wavelength update step S25, and a determination step S26. In this case, it is assumed that the energy spectrum S(E) of the X-rays output from the light source 10 is obtained for each of the energies $E_1$ to $E_N$.

In the initialization step S21, the light intensity distribution I' on the imaging plane of the imaging unit 12 is initialized. That is, each of the pixel values of the light intensity distribution I' is set to 0. Further, in the initialization step S21, a value of an index n indicating the n-th energy $E_n$ out of the energies $E_1$ to $E_N$ is set to 1.

In the transmitted light complex amplitude calculation step S22, a complex amplitude distribution $\psi_n(r)$ of the light of the energy $E_n$ immediately after being transmitted through the observation object is calculated. A light intensity distribution $I_n(r)$ immediately after the light of the energy $E_n$ is transmitted through the observation object is represented by the following Formula (10). A phase change amount $\phi_n(r)$ caused by the light of the energy $E_n$ being transmitted through the observation object is represented by the following Formula (11). The complex amplitude distribution $\psi_n(r)$ of the light of the energy $E_n$ immediately after being transmitted through the observation object is represented by the following Formula (12). In the following formulas, e is the elementary charge. c is the speed of light in vacuum. h is the Planck constant.

[Formula 10]

$$I_n\{r\} = S(E_n)\cdot\exp\{-\mu(E_n)\cdot T(r)\} \tag{10}$$

-continued

[Formula 11]

$$\phi_n(r) = 2\pi \cdot e \cdot E_n \cdot \delta(E_n) \cdot T(r)/ch \quad (11)$$

[Formula 12]

$$\psi_n(r) = \sqrt{I_n(r)} \cdot \exp\{-i\phi_n(r)\} \quad (12)$$

In the light propagation calculation step S23, based on the complex amplitude distribution $\psi_n(r)$ of the light of the energy $E_n$ immediately after being transmitted through the observation object calculated in the transmitted light complex amplitude calculation step S22, the light propagation calculation is performed, and a complex amplitude distribution $\Psi_n$ of the light of the energy $E_n$ on the imaging plane of the imaging unit 12 is calculated. At the time of the above light propagation calculation, a Fresnel diffraction calculation method, an angular spectrum method, or the like is used.

In the light intensity distribution update step S24, the light intensity distribution I' on the imaging plane of the imaging unit 12 is updated by cumulatively adding the square of the absolute value of the complex amplitude distribution $\Psi_n$ of the light of the energy $E_n$ on the imaging plane of the imaging unit 12 calculated in the light propagation calculation step S23 to the light intensity distribution I' (the following Formula (13)).

[Formula 13]

$$I' \leftarrow I' + |\Psi_n|^2 \quad (13)$$

In the wavelength update step S25, the value of the index n is increased by 1, and the next energy is selected. In the determination step S26, it is determined whether or not n is N or less. In the case in which n is larger than N, the processing of the light intensity distribution calculation step S12 is ended. In the case in which n is equal to or less than N, the processing returns to the transmitted light complex amplitude calculation step S22.

The light intensity distribution I' obtained at the end of the processing of the light intensity distribution calculation step S12 is the intensity distribution I' of the X-rays reaching the imaging plane of the imaging unit 12 after being passed through the observation object when the observation object having the thickness distribution T(r) is irradiated with the multi-wavelength X-rays having the X-ray spectrum $S(E_n)$ output from the light source 10.

Figure 10A:
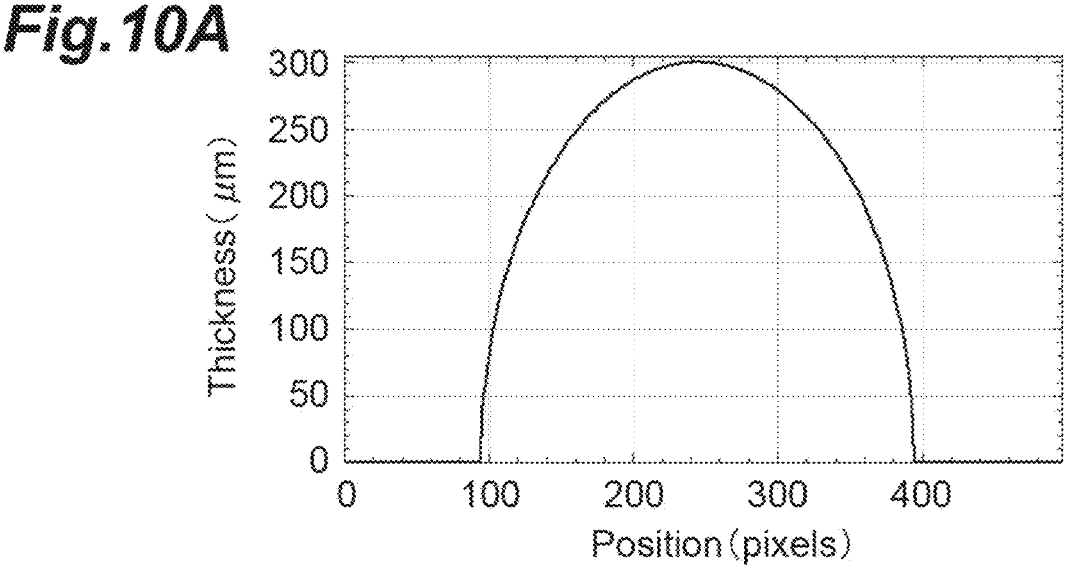
Figure 10B:
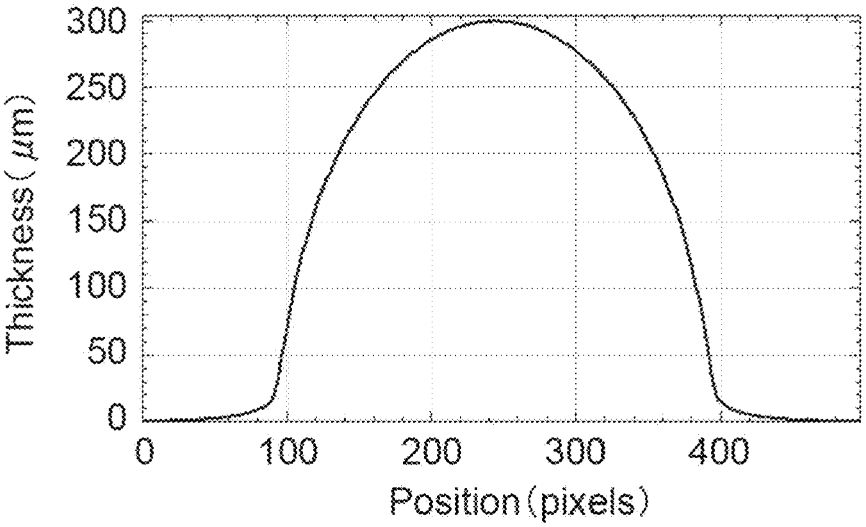
Figure 10C:
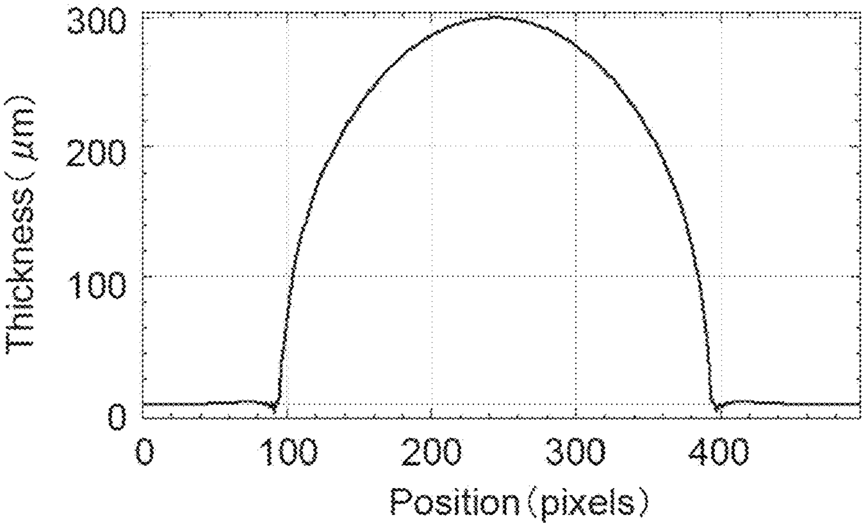

FIG. 10A to FIG. 10C are diagrams showing the intensity distribution and the like in the thickness distribution image of the observation object generated based on the phase contrast image by the simulation. FIG. 10A shows the intensity distribution on the straight line passing through the bead center position in the thickness distribution of the observation object (the polystyrene bead of the spherical shape having the diameter of 300 μm) used in the simulation.

FIG. 10B shows the intensity distribution on the straight line passing through the bead center position in the thickness distribution image generated by setting the X-rays with which the observation object is irradiated to the X-rays having the single wavelength (energy of 8.4 keV), and using the monochromatic Paganin method (the above Formula (1)) with the respective values of μ and δ at the above X-ray energy (the same as the thickness distribution image A shown in FIG. 6). FIG. 10C shows the intensity distribution on the straight line passing through the bead center position in the thickness distribution image generated by setting the X-rays with which the observation object is irradiated to the X-rays having the wide wavelength band, and using the polychromatic Paganin method (the above Formula (3)), and then corrected in the thickness distribution image correction step S4.

As can be seen from these diagrams, the thickness distribution image corrected as described above (FIG. 10C) has the excellent quantitativeness as compared with the thickness distribution images B and C shown in FIG. 6. Further, the corrected thickness distribution image (FIG. 10C) has the excellent quantitativeness also as compared with the thickness distribution image (FIG. 10B) in the case in which the X-rays of the single wavelength are used and the correction is not performed, and in particular, the quantitativeness in the region immediately outside the observation object (the region in which the observation object does not exist) is improved. In addition, the corrected thickness distribution image (FIG. 10C) is in excellent agreement with the actual thickness distribution (FIG. 10A).

Figure 11:
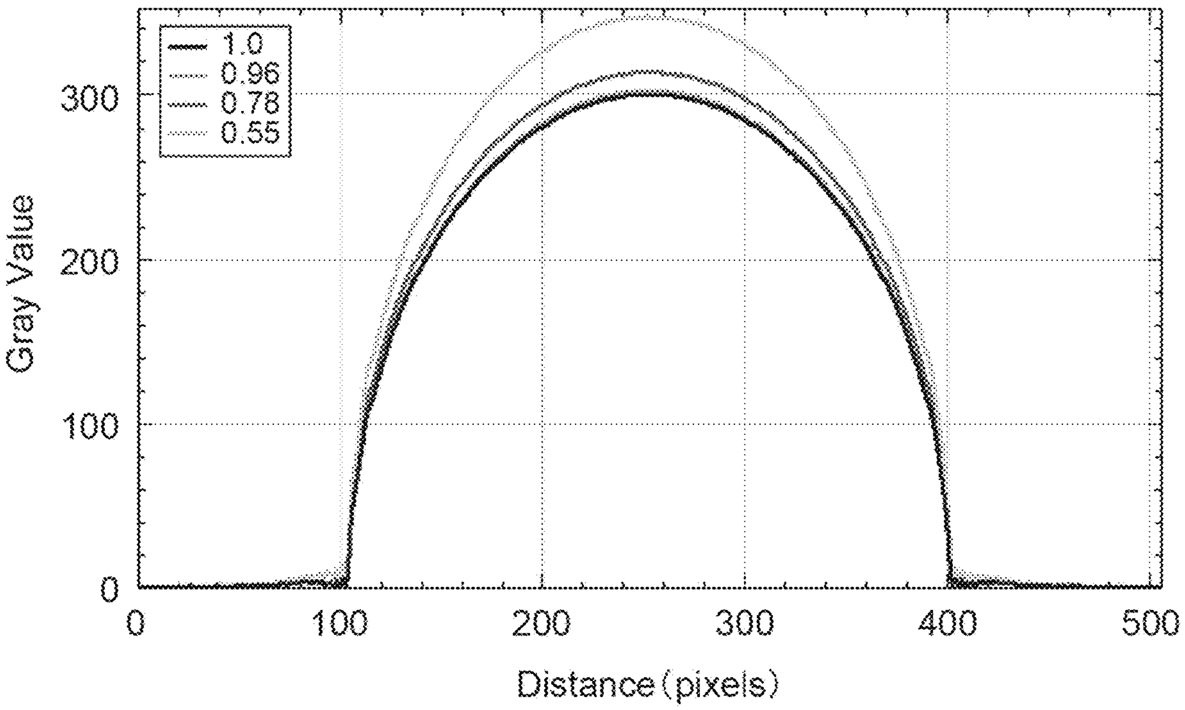
FIG. 11 is a diagram showing influence of a measurement accuracy of a spectrum of light output from a light source on the intensity distribution in the thickness distribution image after the correction.

FIG. 11 is a diagram showing the influence of the measurement accuracy of the spectrum of the light output from the light source on the intensity distribution in the thickness distribution image after the correction. The degree of coincidence (correlation coefficient) between the measured spectrum and the true spectrum is set to respective values of 1.0, 0.96, 0.78, and 0.55. Even in the case in which the degree of coincidence is set to the low value of 0.55, it is confirmed that the thickness distribution image after the correction is excellent in the quantitativeness as compared with the thickness distribution images B and C shown in FIG. 6.

Further, when the influence of the noise is verified, it is confirmed that the influence of the noise is small with respect to the quantitativeness of the thickness distribution image after the correction. That is, the feature that the phase contrast imaging is resistant to the noise is maintained even in the case in which the thickness distribution image is corrected in the thickness distribution image correction step S4.

As described above, according to the present embodiment, the thickness distribution image with the excellent quantitativeness can be generated even in the case in which the phase contrast imaging is performed by using the light source which outputs the light having the wavelength band.

The observation apparatus and the observation method are not limited to the embodiments and configuration examples described above, and various modifications are possible.

The observation apparatus of a first aspect according to the above embodiment includes (1) a light source for outputting light having a wavelength band, and irradiating an observation object with the light; (2) an imaging unit for receiving light output from the light source and passed through the observation object, and acquiring a phase contrast image of the observation object; (3) a thickness distribution image generation unit for generating a thickness distribution image of the observation object based on the phase contrast image; and (4) a thickness distribution image correction unit for correcting the thickness distribution image based on a spectrum of the light output from the light source, and (5) the thickness distribution image correction unit sets the thickness distribution image generated by the thickness distribution image generation unit as an initial image, and repeatedly performs calculation of an intensity distribution of the light after being passed through the observation object based on the spectrum and the thickness distribution image, calculation of an update amount based on the calculated intensity distribution and the phase contrast image, and update of the thickness distribution image based on the calculated update amount.

In the observation apparatus of a second aspect, in the configuration of the first aspect, the thickness distribution image generation unit may normalize the phase contrast image based on a background image acquired by the imaging unit, and may generate the thickness distribution image based on the normalized phase contrast image.

In the observation apparatus of a third aspect, in the configuration of the first or second aspect, the thickness distribution image generation unit may generate the thickness distribution image based on the phase contrast image by using a Paganin method on the assumption that irradiation light with which the observation object is irradiated is monochromatic light.

In the observation apparatus of a fourth aspect, in the configuration of the first or second aspect, the thickness distribution image generation unit may generate the thickness distribution image based on the phase contrast image by using a method obtained by extending a Paganin method on the assumption that irradiation light with which the observation object is irradiated has the wavelength band.

In the observation apparatus of a fifth aspect, in the configuration of any one of the first to fourth aspects, the observation apparatus may further include a spectrum measurement unit for measuring the spectrum of the light output from the light source.

In the observation apparatus of a sixth aspect, in the configuration of the fifth aspect, the imaging unit and the spectrum measurement unit may be configured in common.

The observation method of a first aspect according to the above embodiment includes (1) an imaging step of irradiating an observation object with light having a wavelength band output from a light source, receiving light passed through the observation object by an imaging unit, and acquiring a phase contrast image of the observation object; (2) a thickness distribution image generation step of generating a thickness distribution image of the observation object based on the phase contrast image; and (3) a thickness distribution image correction step of correcting the thickness distribution image based on a spectrum of the light output from the light source, and (4) in the thickness distribution image correction step, the thickness distribution image generated in the thickness distribution image generation step is set as an initial image, and calculation of an intensity distribution of the light after being passed through the observation object based on the spectrum and the thickness distribution image, calculation of an update amount based on the calculated intensity distribution and the phase contrast image, and update of the thickness distribution image based on the calculated update amount are repeatedly performed.

In the observation method of a second aspect, in the configuration of the first aspect, in the thickness distribution image generation step, the phase contrast image may be normalized based on a background image acquired by the imaging unit, and the thickness distribution image may be generated based on the normalized phase contrast image.

In the observation method of a third aspect, in the configuration of the first or second aspect, in the thickness distribution image generation step, the thickness distribution image may be generated based on the phase contrast image by using a Paganin method on the assumption that irradiation light with which the observation object is irradiated is monochromatic light.

In the observation method of a fourth aspect, in the configuration of the first or second aspect, in the thickness distribution image generation step, the thickness distribution image may be generated based on the phase contrast image by using a method obtained by extending a Paganin method on the assumption that irradiation light with which the observation object is irradiated has the wavelength band.

In the observation method of a fifth aspect, in the configuration of any one of the first to fourth aspects, the observation method may further include a spectrum measurement step of measuring the spectrum of the light output from the light source by a spectrum measurement unit.

In the observation method of a sixth aspect, in the configuration of the fifth aspect, the imaging unit and the spectrum measurement unit may be configured in common.

The present invention can be used as an observation apparatus and an observation method capable of generating a thickness distribution image with excellent quantitativeness in the case in which phase contrast imaging is performed using a light source which outputs light having a wavelength band.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An observation apparatus comprising:

a light source configured to output light having a wavelength band, and irradiate an observation object with the light having the wavelength band;

an imaging unit configured to receive light output from the light source and passed through the observation object, and acquire a phase contrast image of the observation object;

a thickness distribution image generation unit configured to generate a thickness distribution image of the observation object based on the phase contrast image; and a computing device configured to correct the thickness distribution image based on a spectrum of the light output from the light source, wherein the computing device is configured to set the thickness distribution image generated by the thickness distribution image generation unit as an initial image, and repeatedly perform calculation of an intensity distribution of the light after being passed through the observation object based on the spectrum and the thickness distribution image, calculation of an update amount based on the calculated intensity distribution and the phase contrast image, and update of the thickness distribution image based on the calculated update amount.

2. The observation apparatus according to claim 1, wherein the thickness distribution image generation unit is configured to normalize the phase contrast image based on a background image acquired by the imaging unit, and generate the thickness distribution image based on the normalized phase contrast image.

3. The observation apparatus according to claim 1, wherein the thickness distribution image generation unit is configured to generate the thickness distribution image based on the phase contrast image by using a Paganin method on the assumption that irradiation light with which the observation object is irradiated is monochromatic light.

4. The observation apparatus according to claim 1, wherein the thickness distribution image generation unit is configured to generate the thickness distribution image based on the phase contrast image by using a method obtained by extending a Paganin method on the assumption that irradiation light with which the observation object is irradiated has the wavelength band.

5. The observation apparatus according to claim 1, further comprising a spectrum measurement unit configured to measure the spectrum of the light output from the light source.

6. The observation apparatus according to claim 5, wherein the imaging unit and the spectrum measurement unit are configured in common.

7. An observation method comprising:

an imaging step of irradiating an observation object with light having a wavelength band output from a light source, receiving light passed through the observation object by an imaging unit, and acquiring a phase contrast image of the observation object;

a thickness distribution image generation step of generating a thickness distribution image of the observation object based on the phase contrast image; and a thickness distribution image correction step of correcting the thickness distribution image based on a spectrum of the light output from the light source, wherein in the thickness distribution image correction step, the thickness distribution image generated in the thickness distribution image generation step is set as an initial image, and calculation of an intensity distribution of the light after being passed through the observation object based on the spectrum and the thickness distribution image, calculation of an update amount based on the calculated intensity distribution and the phase contrast image, and update of the thickness distribution image based on the calculated update amount are repeatedly performed.

8. The observation method according to claim 7, wherein in the thickness distribution image generation step, the phase contrast image is normalized based on a background image acquired by the imaging unit, and the thickness distribution image is generated based on the normalized phase contrast image.

9. The observation method according to claim 7, wherein in the thickness distribution image generation step, the thickness distribution image is generated based on the phase contrast image by using a Paganin method on the assumption that irradiation light with which the observation object is irradiated is monochromatic light.

10. The observation method according to claim 7, wherein in the thickness distribution image generation step, the thickness distribution image is generated based on the phase contrast image by using a method obtained by extending a Paganin method on the assumption that irradiation light with which the observation object is irradiated has the wavelength band.

11. The observation method according to claim 7, further comprising a spectrum measurement step of measuring the spectrum of the light output from the light source by a spectrum measurement unit.

12. The observation method according to claim 11, wherein the imaging unit and the spectrum measurement unit are configured in common.

* * * * *